US010508597B2

(12) United States Patent
Kalya et al.

(10) Patent No.: US 10,508,597 B2
(45) Date of Patent: Dec. 17, 2019

(54) SYSTEMS AND METHODS FOR ICING DETECTION OF COMPRESSORS

(71) Applicant: General Electric Company, Schenectady, NY (US)

(72) Inventors: Prabhanjana Kalya, Hyderabad (IN); Sidharth Abrol, Bangalore (IN); Matthew John McKeever, Greer, SC (US); David Spencer Ewens, Greer, SC (US)

(73) Assignee: General Electric Company, Schenectady, NY (US)

( * ) Notice: Subject to any disclaimer, the term of this patent is extended or adjusted under 35 U.S.C. 154(b) by 365 days.

(21) Appl. No.: 15/485,944

(22) Filed: Apr. 12, 2017

(65) Prior Publication Data
US 2018/0298817 A1 Oct. 18, 2018

(51) Int. Cl.
*F02C 7/047* (2006.01)
*F02C 9/18* (2006.01)
*F04D 27/00* (2006.01)

(52) U.S. Cl.
CPC .............. *F02C 7/047* (2013.01); *F02C 9/18* (2013.01); *F04D 27/009* (2013.01); *F05D 2220/32* (2013.01); *F05D 2260/83* (2013.01)

(58) Field of Classification Search
None
See application file for complete search history.

(56) References Cited

U.S. PATENT DOCUMENTS

| 3,940,622 | A | 2/1976 | Stallabrass et al. |
| 4,852,343 | A | 8/1989 | Norris et al. |
| 7,742,904 | B2* | 6/2010 | Healy ............... G05B 17/02 700/287 |
| 7,874,161 | B2* | 1/2011 | Williams ............ F01D 17/04 60/39.093 |

(Continued)

FOREIGN PATENT DOCUMENTS

| EP | 2 549 081 A1 | 1/2013 |
| EP | 2 843 212 A1 | 3/2015 |

OTHER PUBLICATIONS

U.S. Appl. No. 15/450,830, filed Mar. 6, 2017, Ewens et al.

(Continued)

*Primary Examiner* — Igor Kershteyn
*Assistant Examiner* — Juan G Flores
(74) *Attorney, Agent, or Firm* — Fletcher Yoder, P.C.

(57) ABSTRACT

A system includes a controller coupled to an inlet bleed heat system of a compressor. The controller is configured to detect an icing condition of an inlet portion of the compressor by determining a current compressor efficiency value of the compressor, a current compressor flow value of the compressor, or any combination thereof, comparing the current compressor efficiency value to a compressor efficiency model of the compressor, the current compressor flow value to a compressor flow model of the compressor, or any combination thereof, and providing an icing indication to the inlet bleed heat system if a first difference between the current compressor efficiency value and the compressor efficiency model is greater than a first threshold, a second difference between the current compressor flow value and the compressor flow model is greater than a second threshold, or any combination thereof.

20 Claims, 5 Drawing Sheets

(56) References Cited

U.S. PATENT DOCUMENTS

| | | |
|---|---|---|
| 8,423,161 B2 | 4/2013 | Wilkes et al. |
| 8,639,480 B2 | 1/2014 | Arnold et al. |
| 8,844,258 B2 * | 9/2014 | Ekanayake ............. F02C 7/047 60/39.093 |
| 9,359,959 B2 | 6/2016 | Cuevas et al. |
| 2007/0073525 A1 | 3/2007 | Healy et al. |
| 2008/0243352 A1 | 10/2008 | Healy |
| 2015/0033698 A1 * | 2/2015 | Cuevas .................... F02C 7/30 60/39.093 |
| 2015/0047368 A1 * | 2/2015 | Jones ....................... F02C 9/18 60/782 |
| 2015/0185716 A1 * | 7/2015 | Wichmann ............ F01K 23/101 700/287 |
| 2017/0058785 A1 | 3/2017 | Laskowski |

OTHER PUBLICATIONS

J.J. Lacey, Jr.; Turbine Engine Icing and Ice Detection; ASME Publication, 1972; Rosemount Engineering Co., Minneapolis, Minn.; pp. 1-5.

Extended European Search Report and Opinion issued in connection with corresponding EP Application No. 18164000.4 dated Aug. 23, 2018.

* cited by examiner

SYSTEMS AND METHODS FOR ICING DETECTION OF COMPRESSORS

BACKGROUND

The subject matter disclosed herein relates to a compressor of a gas turbine system and, more particularly, to systems and methods for icing detection of the compressor of the gas turbine system.

Gas turbine systems generally include a compressor, a combustor, and a turbine. The compressor receives air from an air intake, compresses the air, and subsequently directs the compressed air to the combustor. The combustor combusts a mixture of the compressed air and a fuel to produce hot combustion gases. The combustion gases are directed to the turbine to produce work, such as to drive an electrical generator or other load. In some conditions, the air supplied to the air intake of the gas turbine system may include super cooled water droplets, which may result in inlet icing. Anti-icing systems may take control actions to prevent inlet icing from negatively affecting the performance and reliability of the gas turbine system. Unfortunately, traditional anti-icing systems may be too conservative in performing control actions to reduce the icing of the compressor. The traditional anti-icing systems may perform control actions, such as activating an inlet bleed heat system of the compressor, more often than icing actually occurs, thus negatively affecting the performance of the gas turbine system.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In a first embodiment, a system includes a controller coupled to an inlet bleed heat system of a compressor. The controller is configured to detect an icing condition of an inlet portion of the compressor. Further, detecting the icing condition includes determining a current compressor efficiency value of the compressor, a current compressor flow value of the compressor, or any combination thereof. The current compressor efficiency value and the current compressor flow value are based at least in part on sensed compressor values of the compressor. Additionally, detecting the icing condition includes comparing the current compressor efficiency value to a compressor efficiency model of the compressor, the current compressor flow value to a compressor flow model of the compressor, or any combination thereof. Moreover, detecting the icing condition includes providing an icing indication to the inlet bleed heat system if a first difference between the current compressor efficiency value and the compressor efficiency model is greater than a first threshold, a second difference between the current compressor flow value and the compressor flow model is greater than a second threshold, or any combination thereof.

In a second embodiment, a system includes a controller coupled to an inlet bleed heat system of a compressor. The controller is configured to detect an icing condition of an inlet portion of a compressor. Detecting the icing condition includes determining a current compressor efficiency value of the compressor, a current compressor flow value of the compressor, or any combination thereof. The current compressor efficiency value and the current compressor flow value are based at least in part on sensed compressor values of the compressor. Additionally, detecting the icing condition includes comparing a compressor efficiency model of the compressor to the current compressor efficiency value, comparing a compressor flow model of the compressor to the current compressor flow value, or any combination thereof. Moreover, detecting the icing condition includes based on the comparison, determining a first modification to the compressor efficiency model to align the compressor efficiency model with the current compressor efficiency value, a second modification to the compressor flow model to align the compressor flow model with the current compressor flow value, or any combination thereof. Further, detecting the icing condition includes providing an icing indication to an inlet bleed heat system if the first modification to the compressor efficiency model is greater than a first threshold, the second modification to the compressor flow model is greater than a second threshold, or any combination thereof.

In a third embodiment, a method includes receiving ambient environment data including an ambient temperature of a flow to an inlet portion of a compressor, a humidity of the flow to the inlet portion, or any combination thereof. The method also includes receiving sensed compressor values of the compressor comprising a temperature of an output of the compressor, a pressure of the output of the compressor, or any combination thereof. Further, the method includes comparing the ambient environment data to one or more icing thresholds. Additionally, the method includes detecting an icing condition of the inlet portion only if the ambient environment data satisfies the one or more icing thresholds. Detecting the icing condition includes determining a current compressor efficiency value of the compressor, a current compressor flow value of the compressor, or any combination thereof. The current compressor efficiency value and the current compressor flow value are based at least in part on the sensed compressor values of the compressor. Detecting the icing condition also includes comparing the current compressor efficiency value to a compressor efficiency model of the compressor, the current compressor flow value to a compressor flow model of the compressor, or any combination thereof. Further, detecting the icing condition includes providing an icing indication to an inlet bleed heat system if a first difference between the current compressor efficiency value and the compressor efficiency model is greater than a first threshold, a second difference between the current compressor flow value and the compressor flow model is greater than a second threshold, or any combination thereof.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein.

DETAILED DESCRIPTION

Figure 1:
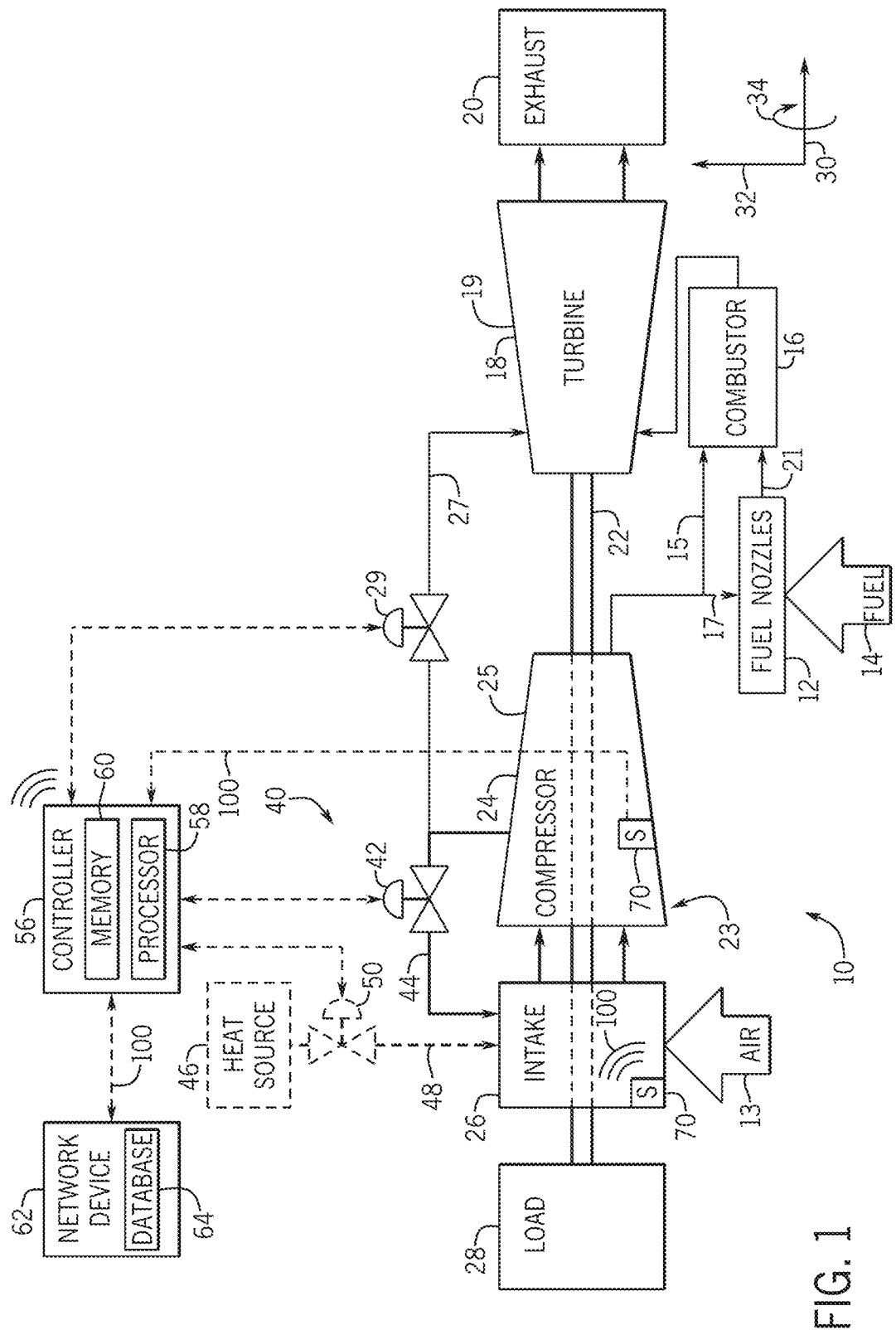
FIG. 1 is a block diagram of an embodiment of a gas turbine system having a controller for detecting an icing condition.

One or more specific embodiments of the present subject matter will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements.

Present embodiments are directed to systems and methods for detecting an icing condition of a compressor of a gas turbine system. When the icing condition is detected, the embodiments further include providing an icing indication to an inlet bleed heat system. Based on the icing indication, the inlet bleed heat system may perform a control action to reduce or eliminate icing of the compressor. A control action may include controlling a bleed flow from the inlet bleed heat system. Traditional anti-icing systems may perform control actions based only on ambient environment conditions that are external to the gas turbine system. Traditional anti-icing systems may be too conservative in their administration of control actions. That is, the traditional anti-icing systems may use the control actions every instance when ambient conditions indicate that icing is merely possible, including instances in which icing has not actually occurred or in which icing is not likely to occur. Because control actions include utilizing the inlet bleed heat system to provide hot, compressed air from the compressor to the intake section, the use of the inlet bleed heat system when icing has not occurred and is not likely to occur may result in wasted energy and expense. Therefore, it is to be understood that benefits of the techniques disclosed herein include increasing efficiency of the gas turbine system by utilizing the inlet bleed heat system more appropriately, such as after icing has begun or when an icing condition indicates that icing is imminent or likely to occur. The embodiments include utilizing sensors that generate sensor-signals representative of a temperature in the compressor, a pressure in the compressor, or ambient conditions of the compressor, among others. In some embodiments, a controller may first determine whether ambient conditions indicate that icing is possible. For example, the controller may determine whether environmental conditions of the air supplied to the gas turbine engine could lead to icing (e.g., low temperature, high humidity, super cooled water droplets present). Then, the controller may proceed to detect an icing condition of the compressor based on determined compressor parameters. The icing condition may be indicative of when icing has occurred or is about to occur in the compressor. The compressor parameters may include, for example, a compressor efficiency and a compressor flow determined from the sensor data. As discussed in detail below, compressor parameters may be based at least in part on a compressor discharge temperature, a compressor discharge pressure, or any combination thereof. When the compressor parameters are outside a predetermined threshold from a baseline, the controller may detect the icing condition. In some embodiments, the icing condition may additionally or alternatively be detected when a modification to the baseline to align the baseline with the compressor parameters is greater than a threshold modification. Accordingly, control actions, such as adding heat to an inlet of the compressor via the inlet bleed heat system, may be taken to reduce or eliminate the icing conditions of the compressor. In this manner, the disclosed embodiments may increase the efficiency of the compressor and gas turbine system by using the control actions more appropriately while reducing wasted energy.

Turning to the drawings, FIG. 1 is a block diagram of an embodiment of a gas turbine system 10 for detecting an icing condition and controlling a response to the icing condition, if detected. The icing condition may be detected for a compressor 24, a portion (e.g., inlet) of the compressor 24, an intake section 26 of the gas turbine system 10, or any combination thereof. The present disclosure may relate to any turbomachine system and the gas turbine system 10 discussed herein does not limit the scope by which the present disclosure applies. A turbomachine system may relate to any system that involves the transfer of energy between a rotor and a fluid, or vice versa, and the illustrated gas turbine system 10 is only meant to serve as a representation of an embodiment of a turbomachine system. As described in detail below, the disclosed gas turbine system 10 (e.g., turbine system, gas turbine) may employ controller 56 to detect the icing condition in the compressor 24 (e.g., in an inlet portion 23 of the compressor 24). As noted above, the gas turbine system 10 may take control actions, such as adding heat via an inlet bleed heat system 40 to reduce or eliminate the detected icing condition.

To generate power, the gas turbine system 10 may use liquid or gas fuel, such as natural gas or a hydrogen rich synthetic gas, to drive the gas turbine system 10. The gas turbine system 10 may include one or more fuel nozzles 12 located inside one or more combustors 16. As depicted, the fuel nozzles 12 intake a fuel 14 and deliver the fuel 14 to the combustor 16. The combustor 16 may also receive an oxidant, such as compressed air 15 from the compressor 24, oxygen, oxygen-enriched air, oxygen reduced air, or any combination thereof. Although the following discussion refers to the oxidant as the compressed air 15, any suitable oxidant may be used with the disclosed embodiments. In some embodiments, as shown by arrow 17, the compressed air 15 may be optionally directed to the fuel nozzles 12. The fuel nozzles 12 may distribute a fuel-air mixture 21 into the combustor 16 in a suitable ratio for desired combustion, emissions, fuel consumption, and power output. In embodiments in which the compressed air 17 is not directed through the fuel nozzles 12, the fuel 14 and the compressed air 15 may mix to form a fuel-air mixture inside the combustor 16. The fuel-air mixture combusts in a chamber within the combustor 16, thereby creating hot pressurized exhaust gases. The combustor 16 directs the exhaust gases through a transition piece into a turbine nozzle and other stages of blades and nozzles. The exhaust gases cause rotation of a turbine 18 within a turbine casing 19 (e.g., outer casing). As the exhaust gases pass through the turbine 18, the gases force turbine blades to rotate a shaft 22 along an axis of the gas turbine system 10.

As illustrated, the shaft 22 may be connected to various components of the gas turbine system 10, including the compressor 24. The compressor 24 also includes blades coupled to the shaft 22, as described in more detail with reference to FIG. 2. As the shaft 22 rotates, the blades within the compressor 24 also rotate within a compressor casing 25 (e.g., outer casing). The blades compress air 13 received from an intake section 26, and the compressor 24 directs the compressed air 17 to the fuel nozzles 12 or the combustor 16. A portion of compressed air (e.g., discharged air) from the compressor 24 may be diverted to the turbine 18 or its components without passing through the combustor 16, as shown by arrow 27. A flow of the discharged air 27 may be controlled by a discharged air flow valve 29. The discharged air (e.g., cooling fluid) may be utilized to cool one or more turbine components, such as shrouds, nozzles on the stator, or buckets on the rotor. The shaft 22 may also be connected to a load 28, which may be a vehicle or a stationary load, such as an electrical generator in a power plant or a propeller on an aircraft, for example. The load 28 may include any suitable device capable of being powered by the rotational output of the gas turbine system 10. The gas turbine system 10 may extend along an axis or axial direction 30, a radial direction 32 toward or away from the axis 30, and a circumferential direction 34 around the axis 30.

Additionally, the inlet bleed heat system 40 may be used to mitigate icing conditions of the compressor 24. The inlet bleed heat system 40 may recirculate a compressor discharge fluid, commonly referred to as "inlet bleed heat," back to the intake section 26 or the inlet portion 23 of the compressor 24. The added heat from the inlet bleed heat system 40 reduces icing on the compressor 24, but may reduce a quantity of compressed air discharged from the compressor 24 to the combustor 16. Accordingly, it may be advantageous to only employ the inlet bleed heat when icing is present or eminent to increase the efficiency of the compressor 24, rather than during all operation of the compressor 24 or when icing is only possible (e.g., environmental conditions are conducive to icing). For example, the environmental conditions may be monitored to determine that icing is possible when temperatures are below a temperature threshold, humidity is above a humidity threshold, or super cooled water droplets are detected. The inlet bleed heat system 40 may include an inlet bleed flow valve 42 disposed along a bleed path 44. The inlet bleed flow valve 42 may be controlled to control a quantity of a bleed flow to the intake section 26 of the gas turbine system 10 or the inlet portion 23 of the compressor 24.

In some embodiments, it is to be understood that the inlet bleed heat system 40 may utilize heat sources other than the bleed flow from the compressor 24 to control detected icing conditions. For example, in some embodiments, the inlet bleed heat system 40 may optionally include a heat source 46 separate from the bleed flow from the compressor. In some embodiments, the inlet bleed heat system may provide a heat flow along a heat path 48 to the intake section 26. The heat path 48 may include a heat source valve 50 that may be controlled to control a quantity of the heat flow to the intake section 26. The heat flow may be added to the intake section 26 and mix with the air 13 entering the compressor 24. The added heat from the heat flow may increase the temperature of the air 13, which may then reduce or eliminate icing of the compressor 24. In some embodiments, the heat source 46 may include a heat exchanger that heats the air 13 received in the air intake 26. The heat exchanger of the heat source 46 may utilize flows of heated fluid from other regions of the gas turbine system 10, such as the combustor 16, the turbine 18, a heat recovery steam generator, a reboiler, or any combination thereof. Additionally, it is to be understood that the inlet bleed heat system 40 shown herein is merely an example of a system that may be used as a control action to reduce or eliminate an icing condition of the compressor 24. Indeed, other anti-icing control actions may be employed in addition to or in place of the inlet bleed heat system 40 based on the icing detection techniques disclosed herein.

Certain icing detection techniques may monitor only the ambient conditions (e.g., humidity, temperature) of the gas turbine system 10 and direct a bleed flow to the compressor 24 whenever the ambient conditions correspond with possible icing of the compressor 24. For example, some icing detection techniques may direct a bleed flow to the compressor 24 whenever environmental conditions indicate icing is possible. For example, the environmental conditions may be monitored to determine that icing is possible when temperatures are below a temperature threshold, humidity is above a humidity threshold, or super cooled water droplets are detected. However, the environmental conditions that indicate icing is possible may not correspond to actual icing in all observed systems. For example, the environmental conditions that indicate icing is possible may only result in icing less than 10% of the time. Accordingly, use of the inlet bleed heat system 40 based on environmental conditions alone may be too conservative, thereby wasting energy of the inlet bleed heat system 40. Accordingly, the embodiments discussed herein may first determine whether ambient conditions indicate an icing condition is possible, then detect whether an icing condition exists based on compressor parameters, such as compressor efficiency, compressor flow, or any combination thereof. Then, control actions, such as activating the inlet bleed heat system 40 to direct a bleed flow to the intake section 26 or the inlet portion 23 of the compressor 24 may be utilized more appropriately, thereby increasing the efficiency of the gas turbine system 10.

A controller 56 (e.g., an electronic or processor-based controller) may govern operation of the gas turbine system 10. The controller 56 may communicate with control elements of the gas turbine system 10, adjust combustion parameters, adjust flows of the fluids throughout the system, adjust operation of the gas turbine system 10, receive sensor inputs, and so forth. The controller 56 may independently control operation of the gas turbine system 10 by electrically communicating with sensors, control valves, and pumps, or other flow adjusting features throughout the gas turbine system 10. For example, the controller 56 may control the inlet bleed heat system 40, the inlet bleed flow valve 42, the heat source valve 50, and the discharged air flow valve 29. The controller 56 may include a distributed control system (DCS) or any computer-based workstation that is fully or partially automated. For example, the controller 56 can be any device employing a general purpose or an application-specific processor 58, both of which may generally include memory 60 (e.g., memory circuitry) for storing instructions.

The processor 58 may include one or more processing devices, and the memory 60 may include one or more tangible, non-transitory, machine-readable media collectively storing instructions executable by the processor 58 to control the gas turbine system 10. The processor 58 of the controller 56 may be used to detect the icing condition and perform control actions. More specifically, the controller 56 receives input signals from various components of the gas turbine system 10 and outputs control signals to control and communicate with various components in the gas turbine system 10. The controller 56 may control the flow rates, motor speeds, valve positions, and emissions, among others, of the gas turbine system 10.

Although the controller 56 has been described as having the processor 58 and the memory 60, it should be noted that the controller 56 may include a number of other computer system components to enable the controller 56 to control the operations of the gas turbine system 10 and the related components. For example, the controller 56 may include a communication component that enables the controller 56 to communicate with other computing systems. The controller 56 may also include an input/output component that enables the controller 56 to interface with users via a graphical user interface or the like.

As shown in the present embodiment, the controller 56 is coupled to a network device 62. It is to be noted that either or both the controller 56 and the network device 62 may perform or include the embodiments described herein. In some embodiments, the network device 62 may be a cloud-based platform, such as a service (PaaS). In some embodiments, the network device 62 may perform industrial-scale analytics to analyze performance of the gas turbine system 10 and each component (e.g. compressor 24) of the gas turbine system 10. As shown, the network device 62 is communicatively coupled to a database 64. The database 64 and the memory 60 may store historical data related to the gas turbine system 10 (e.g., received by the one or more sensors), one or more models, and other data. For example, the database 64 and the memory 60 may store an icing model for detecting an icing condition of the compressor 24, and providing an icing indication to the inlet bleed heat system 40. The controller 56 may compare the icing model to sensed data to detect the icing condition and perform a control action based on the icing indication. The control action may include determining a quantity of the bleed flow of the inlet bleed heat system 40, displaying an indication to an operator, or other control actions, as described in greater detail below.

In addition, the communication between the controller 56, the network device 62, and other components of the gas turbine system 10 may be via a wireless (e.g., Bluetooth® Low Energy, ZigBee®, WiFi®) or wired connection (e.g., Ethernet). In some embodiments, the controller 56 and the network device 62 may include a laptop, a smartphone, a tablet, a personal computer, a human-machine interface, or the like. In some embodiments, the controller 56 and the network device 62 may be a single computing device that performs the functions of controlling the turbomachinery. Furthermore, in some embodiments, the embodiments disclosed herein may be at least partially embodied using hardware implementations. For example, logic elements of the controller 56 and the network device 62 may include a field-programmable gate array (FPGA), or other specific circuitry.

As illustrated, the controller 56 is in communication with one or more sensors 70 disposed within the compressor 24. The sensors 70 may collect data related to ambient conditions or the compressor 24 and transmit sensor-signals 100 (e.g., voltages) indicative of the data to the controller 56. For example, the sensors 70 may be coupled to the compressor casing 25 of the compressor 24 to collect data. The sensors 70 may transmit signals representative of temperature in the compressor, a pressure in the compressor, or other compressor data at the one or more stages, as described in more detail with reference to FIG. 2 below. Accordingly, the sensor 70 may be any type of sensor suitable for collecting compressor data, such as an acoustic sensor, a pressure sensor, a vibration sensor, a piezoelectric sensor, a temperature sensor, or any combination thereof. In some embodiments, the sensor 70 may be a different type of sensor and collect a different type of data related to the gas turbine system 10, as discussed with reference to FIG. 3. In some embodiments, the sensor-signals 100 may be transmitted to the database 64 of the network device 62 from the sensors 70 or from the controller 56.

Additionally, one or more sensors 70 may be disposed within the gas turbine system 10. For example, there may be one or more sensors 70 (e.g., ambient environment sensors) in the gas turbine system 10 that collect ambient data (e.g., ambient environment data) used to determine ambient conditions of the gas turbine system 10. In particular, the ambient data may include an ambient temperature of the air 13 to the intake section 26, humidity of the air 13 to the intake section 26, or other ambient data. To collect the ambient data, the sensors 70 may be disposed on a surface (e.g., inner surface, outer surface) of the intake section 26, an inner surface of the compressor casing 25, an outer surface of various components of the gas turbine system 10, or any other location suitable for collecting ambient data of the gas turbine system 10. Accordingly, sensors 70 used to collect ambient data may be any suitable type of sensor, such as an acoustic sensor, a pressure sensor, a vibration sensor, a piezoelectric sensor, a temperature sensor, a humidity sensor, a dust sensor, or any combination thereof.

The controller 56 may determine ambient conditions based on the ambient data before detecting the icing condition of the compressor 24. For example, in some embodiments, the controller 56 may compare the ambient data to one or more icing thresholds, then proceed to detect if the icing condition exists only if the icing threshold is satisfied. That is, the controller 56 may detect if the icing condition exists in the inlet portion 23 or in the compressor 24 only if the icing threshold is satisfied. Humidity ambient data may satisfy the icing threshold only if the humidity is above a certain percentage. Temperature ambient data may satisfy the icing threshold only if the temperature is below a certain threshold (e.g., less than 10 degrees Celsius). It is to be understood that the ambient condition determinations discussed herein are merely exemplary. Indeed, the controller 56 may determine whether ambient conditions are indicative of possible icing in the compressor 24 via any ambient condition icing detection methods, such as the detection of super cooled water droplets. By determining when icing conditions are possible, and performing condition-based detection of the icing condition only when the icing conditions are possible, control actions may be utilized more appropriately, thereby resulting in further increased efficiency of the gas turbine system 10. Additionally, the controller 56 may utilize resources (e.g., processor 58) more efficiently by analyzing sensor data to detect an icing condition only when icing conditions are possible.

Figure 2:
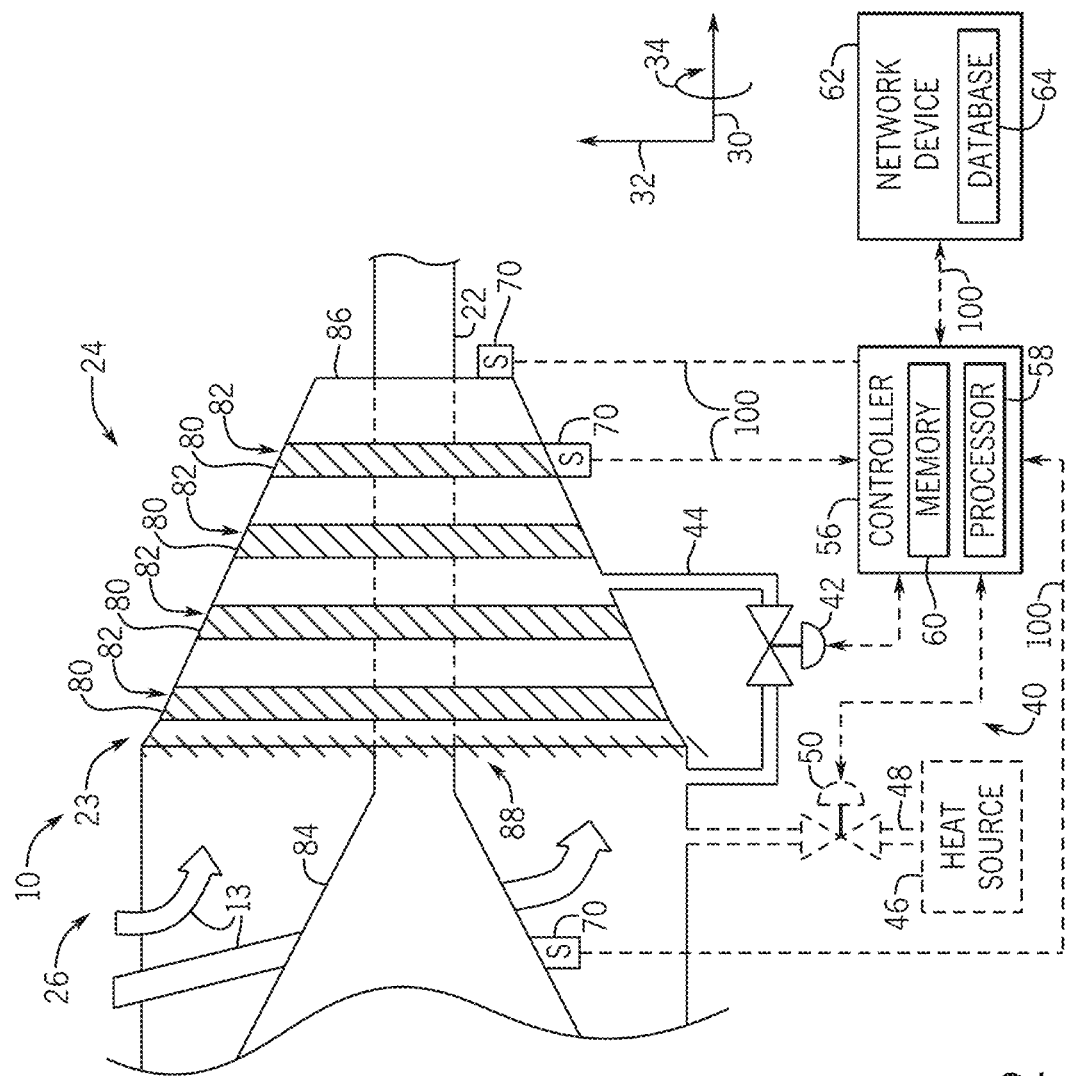
FIG. 2 is a schematic diagram of an embodiment of a compressor of the gas turbine system of FIG. 1.

The techniques disclosed herein may be better understood with reference to a more detailed description of the gas turbine system 10. Turning now to FIG. 2, the compressor 24 may include several sets of blades 80 that are arranged in stages or rows 82 around the rotor or shaft 22. The compressor 24 of FIG. 2 is described with reference to the elements of FIG. 1. The inlet portion 23 of the compressor 24 may receive air 13 (e.g., fluid) from the intake section 26. The intake section 26 may include a conical inner surface 84 to provide cooling to components of the compressor 24. One or more stages 82 of the compressor 24 may be considered as part of the inlet portion 23 of the compressor 24. For example, the inlet portion 23 may include the upstream 10% to 25% of the compressor 24. During operation, the air 13 travels in the axial direction 30 through the compressor 24, becomes compressed by the sets of blades 80 of the compressor 24, and is discharged from an output 86 of the compressor 24 to a combustion system (e.g., the combustor 16 and the turbine 18). That is, each set of blades 80 rotatively moves the air through the compressor 24 while reducing the volume of the air, thereby compressing the air.

A set of inlet guide vanes 88 may control the amount of air that enters the compressor 24 at any given time. In some embodiments, the inlet guide vanes may be rotated angles relative to the radial direction 32 of the gas turbine system 10 to control the amount of air that enters the compressor 24. When the angles of the inlet guide vanes are relatively small (i.e., "substantially closed") less air is received, but when the angles of the blades are relatively large (i.e., "substantially open") more air is received. The angles of the blades of the inlet guide vanes 88 may be controlled by the controller 56 as a control action to reduce or eliminate the detected icing condition.

When an icing condition of the compressor 24 is present, the compressor 24 or the inlet portion 23 of the compressor 24 may already have ice accumulation, or ice accumulation on the compressor 24 or the inlet portion 23 may be imminent. That is, water droplets may freeze on components (e.g., one or more sets of blades 80 or inlet guide vanes 88) of the compressor 24 when there is an icing condition. A small amount of icing may have little or no negative effect on the operation of the compressor 24. However, an increased amount of icing may result in decreased efficiency of the gas turbine system 10 or damage to components of the compressor 24 if no control actions are taken. Accordingly, control actions may be employed when the icing condition is detected to reduce or eliminate icing of the compressor 24. Further, it may be economically favorable to only take control actions after an icing condition has been detected, in contrast to some conservative anti-icing techniques that may activate control actions to prevent icing when ambient conditions only indicate that icing of the compressor 24 is possible.

Additionally, as discussed above, the controller 56 may control the inlet bleed heat system 40 as a control action to reduce or eliminate the detected icing condition. For example, the controller 56 may control the inlet bleed flow valve 42 to control the bleed flow along the bleed path 44. Optionally, the controller 56 may additionally control the heat source valve 50 to control the heat flow along the heat path 48. The flows are added to the air 13 that is directed to the inlet portion 23 of the compressor 24. The bleed flows may be adjusted based on certain parameters of the compressor 24 or based on calculations of the controller 56. Advantageously, the techniques described herein may control the inlet bleed heat system 40 as a control action in response to a detected icing condition to reduce or eliminate the detected icing in the compressor 24.

In some embodiments, the controller 56 may collect compressor data and ambient data from one or more sensors 70. As shown in the present embodiment, sensors 70 are included in the compressor 24. In some embodiments, the sensors 70 (e.g., ambient sensors, ambient environment sensors) are disposed in the intake section 26. The sensors 70 may additionally be disposed inside the intake section 26 to transmit ambient data related to air 13 entering the compressor 24. Additionally, the sensors 70 (e.g., compressor sensors) may be disposed in the compressor 24, downstream of the compressor 24, or any combination thereof. The sensors 70 may include, for example, any type of sensor suitable for collecting compressor data, ambient data, or any combination thereof, as discussed above with reference to FIG. 1.

As shown, the sensor-signals 100 (e.g., voltages) indicative of compressor data and ambient data may be transmitted to the controller 56. The controller 56 may additionally transmit the sensor-signals 100 to the network device 62. In embodiments in which the network device 62 is included in the controller 56, the sensor-signals 100 generated by the sensors 70 may be transmitted directly to the network device 62. The network device 62 may store the ambient data and the compressor data within the database 64 for later use.

The controller 56 may process the sensor-signals 100 to generate one or more compressor parameters utilized via the icing model to detect the icing condition of the compressor 24. For example, the controller 56 may determine current compressor efficiency values and current compressor flow values based on the sensor-signals 100. The current compressor efficiency values and the current compressor flow values may be determined based on an adaptive real-time model. In some embodiments, the adaptive real-time model may be employed by the controller to predict the current compressor efficiency values and the current compressor flow values based on the instantaneously sensed sensor-signals 100. The current compressor efficiency values and the current compressor flow values may be determined based on the real-time input from many types of sensors, such as compressor inlet temperature, inlet dew point temperature, compressor discharge temperature, compressor discharge pressure, or any combination thereof. That is, as each sensor-signal 100 is received by the controller 56, the current compressor efficiency value and the current compressor flow value for each sensor-signal 100 may be determined via the adaptive real-time model, data match multipliers (e.g., parameters that equalize a modeled parameter with a measured values), rigorous estimations, and the like. The sensor-signals 100 may be assigned a time-stamp or a sample number based at least in part on the sensor 70 from which it was transmitted. In some embodiments, the controller 56 may transmit the sensor-signals 100 to the network device 62. The network device 62 may store the sensor-signals 100 in the database 64 and later retrieve the sensor-signals 100 from the database 64 for further processing. In certain embodiments, the network device 62 may be located remote from the gas turbine system 10. Additionally, in some embodiments, the network device 62 may perform the ice detection methods disclosed herein.

The controller 56 may generate a baseline model for each compressor parameter, such as the compressor efficiency and the compressor flow. The baseline model for each compressor parameter may be a predetermined model that is employed by the controller 56 to predict each compressor parameter based on known factors of the gas turbine system. For example, the baseline model for each compressor parameter may be determined or predetermined based on an operational time of the gas turbine system 10, a number of hours fired of the gas turbine system, or other factors indicative of the gas turbine system 10. For example, a compressor efficiency model may be generated from a predetermined number of compressor efficiency values in order to establish an expected range of compressor efficiencies for the compressor 24 when an icing condition is not present. Similarly, a compressor flow model may be generated from a predetermined number of compressor flow values in order to establish an expected range of compressor flows for the compressor 24 when an icing condition is not present. The values may be utilized to generate the baseline models, which may be stored in the memory 60 or the database 64 for later comparison against current compressor parameter values. The controller 56 may receive sensor-signals 100 indicative of various independent variables, including but not limited to compressor inlet temperatures, inlet dew point temperatures, compressor discharge temperature, and compressor discharge pressure. Additionally, the controller 56 may update the baseline models based at least in part on predicted degradations of the compressor parameters over a lifetime of the compressor. For example, the controller 56 may update the compressor efficiency model based on a predicted efficiency degradation. Further, the controller 56 may update the compressor flow model based at least in part on a predicted flow degradation. An example of the inputs and outputs of the controller 56 used to determine one or more compressor parameters will be described with reference to FIG. 3 below. An example of detecting icing conditions based on the compressor parameter and the corresponding compressor parameter model will be described in greater detail with reference to FIG. 4 below.

Figure 3:
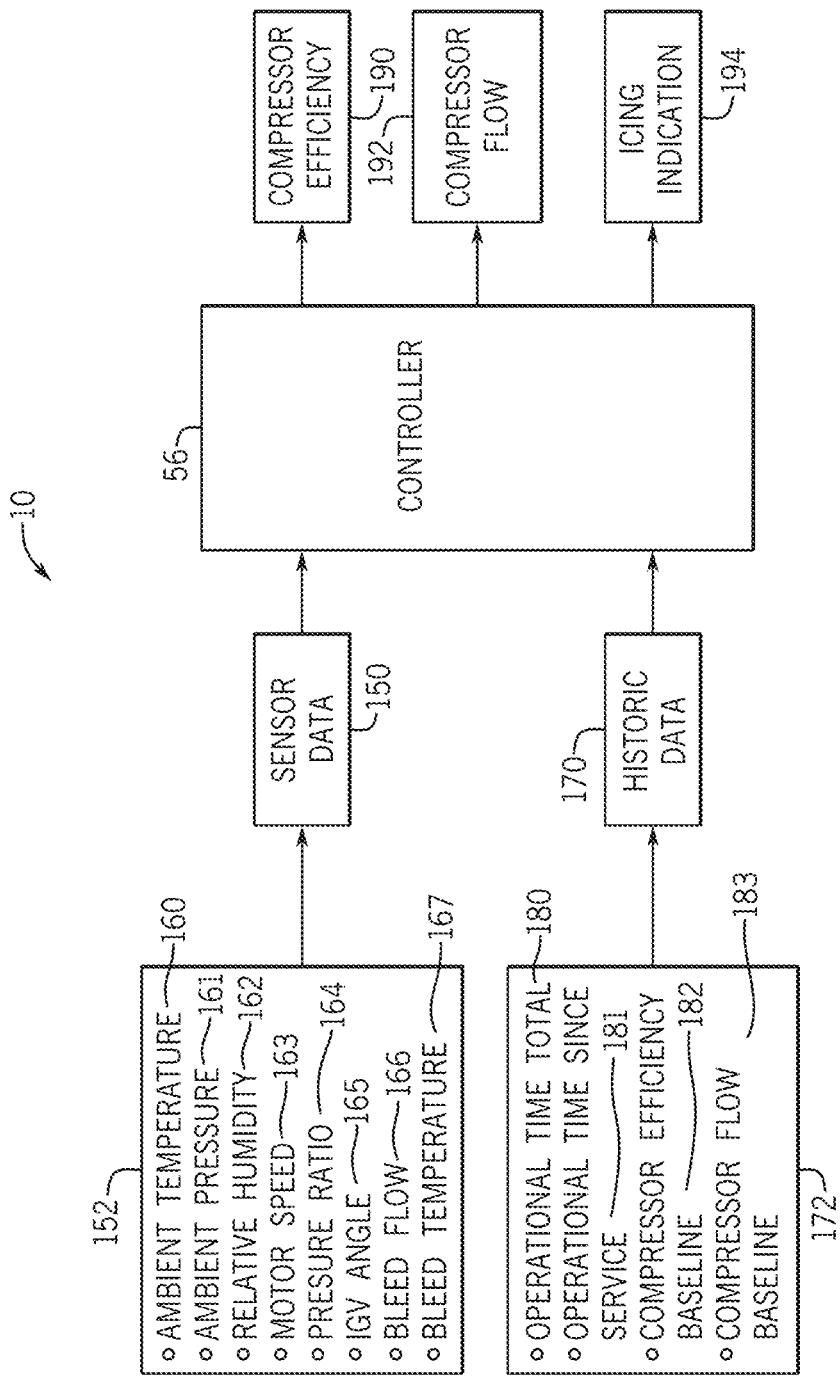
FIG. 3 is a block diagram of an embodiment of the controller of FIG. 1.

FIG. 3 is a block diagram of an embodiment of the controller 56 for detecting the icing condition of the inlet portion 23 of a compressor 24. As shown, the controller 56 may receive inputs and calculate or determine the compressor parameters. The controller 56 may detect the icing condition based at least in part on a comparison of the compressor parameters to baseline models. As discussed above, the baseline models may be predetermined models that are employed by the controller 56 to predict each compressor parameter based on known factors of the gas turbine system.

For example, the controller 56 may receive sensor data 150 from the sensors 70. The sensor data 150 may include sensor inputs 152 (e.g., sensor-signals 100) from one or more of the sensors 70 (e.g., compressor sensor, ambient environment sensors) described above. In some embodiments, the sensor data 150 includes ambient temperature 160, ambient pressure 161, relative humidity 162, a speed 163 of the compressor 24, a pressure ratio 164 of the compressor 24, an angle of the inlet guide vanes 165, a bleed flow quantity 166 from the inlet bleed heat system 40, a bleed flow temperature 167, or any combination thereof. These types of sensor data 150 are intended only as examples. Accordingly, more or different types of sensor data 150 may be input to the controller 56 for detection of the icing condition.

The controller 56 may also receive historic data 170. The historic data 170 may be stored in the database 64 of the network device 62 or in the memory 60 of the controller 56. Additionally, the historic data 170 may include sensor data 150 that was previously received by the controller 56. Further, the historic data 170 may include historic inputs 172, such as a total operational time 180 of the gas turbine system 10 or the compressor 24, an operational time 181 since the compressor 24 was last serviced, compressor parameter baselines, such as a compressor efficiency baseline 182, a compressor flow baseline 183, or other historic values related to the gas turbine system 10. The compressor efficiency baseline 182 and the compressor flow baseline 183 may be models used by the controller 56 to detect an icing condition.

Based at least in part on the sensor data 150, the controller 56 may determine (e.g., calculate) values of compressor efficiency 190 and values of compressor flow 192. In some embodiments, the values of the compressor efficiency 190 and the values of the compressor flow 192 are determined in real time by generating and utilizing a model of the gas turbine, then reconciling an output of the model of the gas turbine with the sensor data 150. That is, as discussed above, an adaptive real-time model may be employed by the controller 56 to predict the values of compressor efficiency 190 and values of compressor flow 192 based on the sensor data 150. For example, the compressor efficiency 190 and the compressor flow 192 may be determined by data match multipliers, rigorous estimations, or other computational methods. The compressor efficiency 190 and the compressor flow 192 may be monitored over time and compared to a respective baseline (e.g., baseline model) for each compressor parameter. The controller 56 may determine a predefined threshold for each compressor parameter based on the respective baseline. For example, an efficiency threshold may be predetermined for the compressor efficiency, and a flow threshold may be predetermined for the compressor flow. Additionally or alternatively, the controller 56 may also determine a predetermined threshold rate of change for each compressor parameter based on the predicted degradation of the gas turbine system 10. For example, an efficiency rate threshold may be predetermined for the compressor efficiency, and a flow rate threshold may be predetermined for the compressor flow. In some embodiments, the predetermined threshold rate of change may be based at least in part on the total operational time 180, the operational time 181 since service, or any combination thereof.

Then, the controller 56 may detect the icing condition and generate an icing indication 194 if one or more of the compressor parameters go outside of the predetermined threshold. Further, the controller may detect the icing condition and generate the icing indication 194 if a rate of change (e.g., change rate) of one or more compressor parameters exceeds the predetermined threshold rate of change. It is to be understood that the icing condition of the compressor 24 may be detected based on the compressor parameters exceeding one or both of the predetermined threshold and the predetermined threshold rate of change. Further, the controller 56 may detect the icing condition and generate the icing indication 194 based on modifications to models of the compressor parameters. For example, if a modification made to the baseline for one compressor parameter to align the baseline with a newly determined compressor parameter is greater than a modification threshold, the icing indication 194 may be generated.

Additionally the icing indication 194 may be provided to the inlet bleed heat system 40 to initiate a control action to mitigate the icing condition. An example of a compressor parameter comparison with a predetermined threshold during detection of an icing condition is discussed below with reference to FIG. 4. Further, it is to be understood that the compressor efficiency 190 and the compressor flow 192 are examples of compressor parameters. Accordingly, other compressor parameters indicative of operation of the compressor 24 may be utilized by the techniques disclosed herein to detect the icing condition and generate the icing indication 194.

Figure 4:
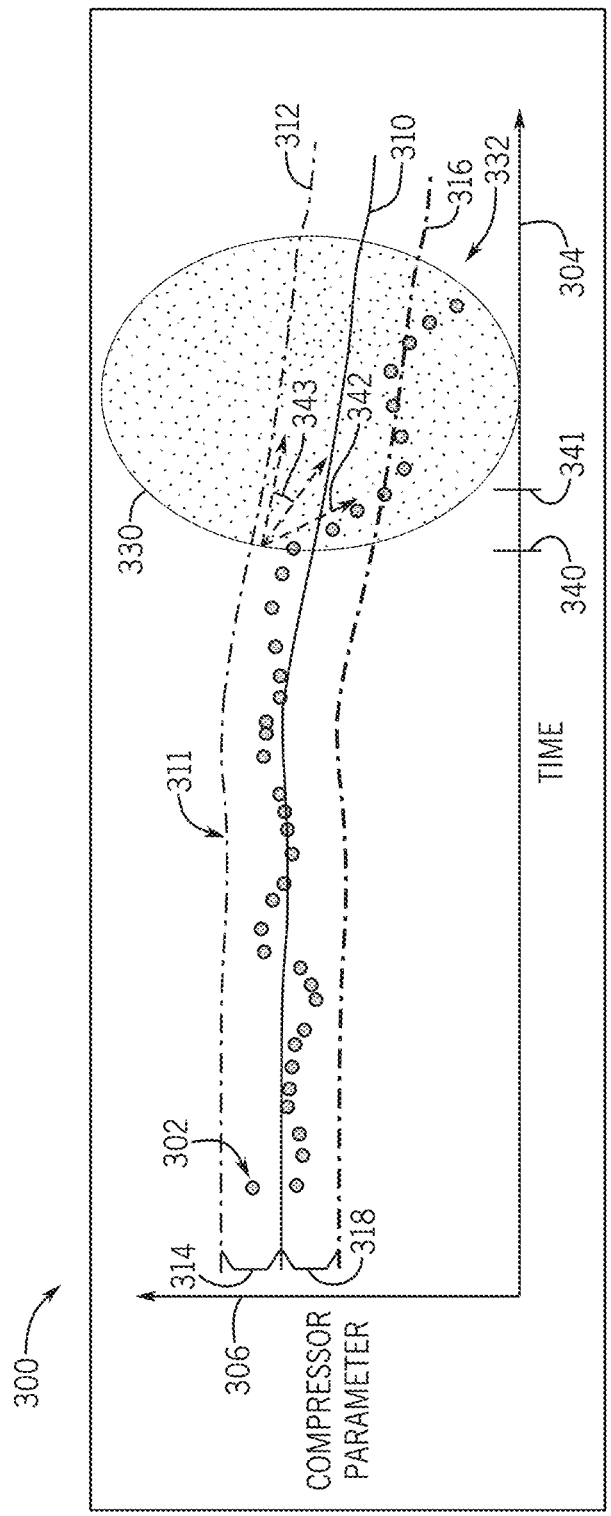
FIG. 4 is a graphical representation of an embodiment of a compressor parameter determined by the controller of FIG. 1, and the detection of the icing condition.

FIG. 4 is a graphical representation 300 of an embodiment of values 302 of compressor parameters used to detect the icing condition of the compressor 24. The values 302 are shown for purposes of illustration. Other signals representative of other compressor parameters may also be used. For example, the values 302 may be representative of compressor efficiency, compressor flow, or a combined parameter including both compressor efficiency and compressor flow. Reference numeral 304 (X-axis) is representative of time of the values 302. Also, reference numeral 306 (Y-axis) is representative of the compressor parameter, such as compressor efficiency. As discussed above, the values 302 of compressor parameters may be analyzed via multivariate analysis, and thus, may be compared to many various independent variables, including one or more of the sensor inputs 152. Accordingly, it is to be understood that the compressor parameter and time described herein include two dimensions of multiple possible dimensions usable for detecting the icing condition. Additionally, the values 302 appear to be generally decreasing over time, because it is to be understood that during normal operation of the compressor, compressor parameters such as the compressor efficiency and the compressor flow parameter are generally expected to decrease over long periods of time. However, scheduled maintenance and other modifications may affect the values 302 in an expected manner that may be accounted for by the techniques disclosed herein.

To aid in visualization of the detection of the icing condition, a baseline 310, such as the compressor efficiency model or the compressor flow model, may also be shown on the graphical representation 300. The baseline 310 may be a predetermined model employed to predict each compressor parameter based on known factors of the gas turbine system 10. Further, a predefined threshold 311 of the compressor parameter may be defined based on the baseline 310. For example, the predefined threshold 311 may include an upper threshold 312 defined at an upper value 314 relative to the baseline 310. Similarly, the predefined threshold 311 may include a lower threshold 316 defined at a lower value 318 relative to the baseline 310. Although the upper value 314 and the lower value 318 appear to be equal in the present embodiment, it is to be understood that in some embodiments, the upper value 314 and the lower value 318 may be different from one another. Accordingly, various samples (e.g., data points) of the values 302 may be plotted on the graphical representation 300 to compare to the predefined threshold 311 for detection of the icing condition. Additionally, in some embodiments, a rate of change (e.g. derivative) may be defined as a difference between sequential samples of compressor parameter values 302 divided by a difference between times of the respective sequential samples.

In some embodiments, the controller 56 may detect the icing condition when the values 302 are outside the predefined threshold 311. For example, the icing condition may be detected when one or more values 302 are greater than the upper threshold 312 or less than the lower threshold 316. Further, in some embodiments, the controller 56 may detect the icing condition when the rate of change of the values 302 is greater than a predetermined threshold rate of change 343. Additionally, the controller 56 may detect the icing condition when both values 302 are outside the predefined threshold 311 and the rate of change of the values 302 is greater than the predetermined threshold rate of change 343. By considering the rate of change of the values 302 when detecting icing conditions, the techniques disclosed herein may distinguish between when an icing condition is present and other changes in the compressor parameters caused by fouling or process changes.

Further, in some embodiments, the controller 56 may modify the baseline 310 and predefined threshold 311 based on predicted compressor parameter degradations (e.g. a predicted efficiency degradation, a predicted flow degradation) or an identified operating condition of the compressor 24. The operating condition of the compressor 24 may be identified as a start-up mode, a steady-state mode, a loading mode, an unloading mode, or a shut down mode, among others. For example, the baseline 310 based on the compressor efficiency model may generally decrease over the lifetime of the operation of the compressor in the steady-state mode between service intervals. An expected decrease in compressor efficiency over the lifetime may be embodied in the predicted efficiency degradation. However, detected decreases in the compressor efficiency during operation in the steady-state mode at rates greater than the predicted degradation rate may correspond to an icing condition. It is understood that the baseline 310 and predefined threshold 311 for the compressor parameter (e.g., compressor efficiency) may be lower during startup mode or shut down mode than during steady-state mode. Moreover, it is understood that the expected rate of change of the compressor parameter during a loading mode or an unloading mode may exceed the expected rate of change of the compressor parameter during a steady-state mode.

In some embodiments, an icing condition 330 is detected in the values 302 at time 341 when the values 302 begin to be outside the predetermined threshold 311. In some embodiments, the controller 56 may detect the icing condition at time 340 when the detected rate of change 342 of the values 302 is greater than the predetermined threshold rate of change 343. Although the icing condition 330 is described as being detected by the controller 56, it is to be understood that in some embodiments, detection of the icing condition 330 described herein may also be performed by the network device 62, or any other suitable device.

In some embodiments, the controller 56 detect the icing condition 330 based on modifications (e.g., adjustments) made to the baseline 310 to align (e.g., tune) the baseline 310 with values 302 of compressor parameters. For example, the controller 56 may determine a modification to the compressor efficiency model to align the compressor efficiency model with the current compressor efficiency value. Additionally, the controller 56 may determine a modification to the compressor flow model to align the compressor flow model with the current compressor flow value. In some embodiments, the modification may be the utilization of a multiplier or other tuning adjustments to models. The modifications may then be compared to respective modification thresholds to detect the icing condition 330. For example, the controller 56 may compute that the modification to the baseline 310 changes a coefficient of the baseline 310 by 50%. However, the respective modification threshold for the coefficient may be 20%. Accordingly, the controller 56 may therefore determine that because the modification to the coefficient is greater than the respective modification threshold, the modification to the baseline 310 is indicative of the icing condition 330. The controller 56 may detect the icing condition 330 based on modifications to the baseline for one or more compressor parameters.

To reduce or eliminate the icing condition 330, the controller 56 may perform one or more control actions. In some embodiments, the control action may be performed until the values 302 are within the predetermined threshold 311. In some embodiments, the control action may be performed for a predetermined amount of time based on an amount by which the values 302 are beyond the predetermined threshold 311. When the values 302 cross back within the predetermined threshold 311, the controller 56 may determine that the icing condition is reduced or eliminated such that the control action may be adjusted or stopped. The control action may include transmitting a signal indicative of the icing condition 330 to the inlet bleed heat system 40, determining a temperature or quantity of the bleed flow from the inlet bleed heat system 40 that may cause the values 302 to be within the predetermined threshold 311, controlling elements of the inlet bleed heat system 40 to achieve the determined quantity of the bleed flow, or providing an icing indication to an operator to enable manual control of the icing condition 330. In some embodiments, the controller 56 may automatically cause the inlet bleed heat system 40 to start the bleed flow after the icing indication has been provided. Although the control action is described as being performed by the controller 56, it is to be understood that in some embodiments, the control action described herein may also be performed by the network device 62, or any other suitable device.

Detection of the icing condition 330 may be specifically adapted for each gas turbine system 10 and a desired amount of error rejection. In some embodiments, the controller 56 may determine that there is not an icing condition if the values 302 do not cross the predetermined threshold 311, even if the rate of change of the values is greater than the predetermined threshold rate of change. Additionally, the controller 56 may determine that there is not an icing condition if the values 302 do not have a rate of change greater than the threshold rate of change, even if the values 302 are outside of the predetermined threshold 311. Further, the controller 56 may determine that there is not an icing condition if the modifications to the baseline 310 to align the baseline 310 with the values 302 are not greater than the respective modification thresholds. Additionally, if the values 302 only cross the predetermined threshold 311 or have a rate of change greater than the threshold rate of change for a brief period of time (e.g., less than 1, 5, 15, or 30 seconds), the controller 56 may perform a minor control action. The minor control action may be a more passive control action, such as recommending a control action via display of an indication, thus alerting any operators that an icing condition may soon occur. By detecting the icing condition 330 when the rate of change is greater than the predetermined threshold rate of change, the values 302 are beyond the predetermined threshold 311, the modifications to the baseline 310 to align the baseline 310 with the values are greater than the respective modification thresholds, or any combination thereof, the techniques disclosed herein may perform control actions more efficiently compared to anti-icing techniques that utilize inlet bleed heat systems each time ambient conditions indicate icing is possible. That is, by performing control actions in response to a detected current icing condition or a detected imminent icing condition, the techniques disclosed herein increase the efficiency of the gas turbine system relative to an anti-icing system that utilizes inlet bleed heat systems when icing is merely a possibility.

Figure 5:
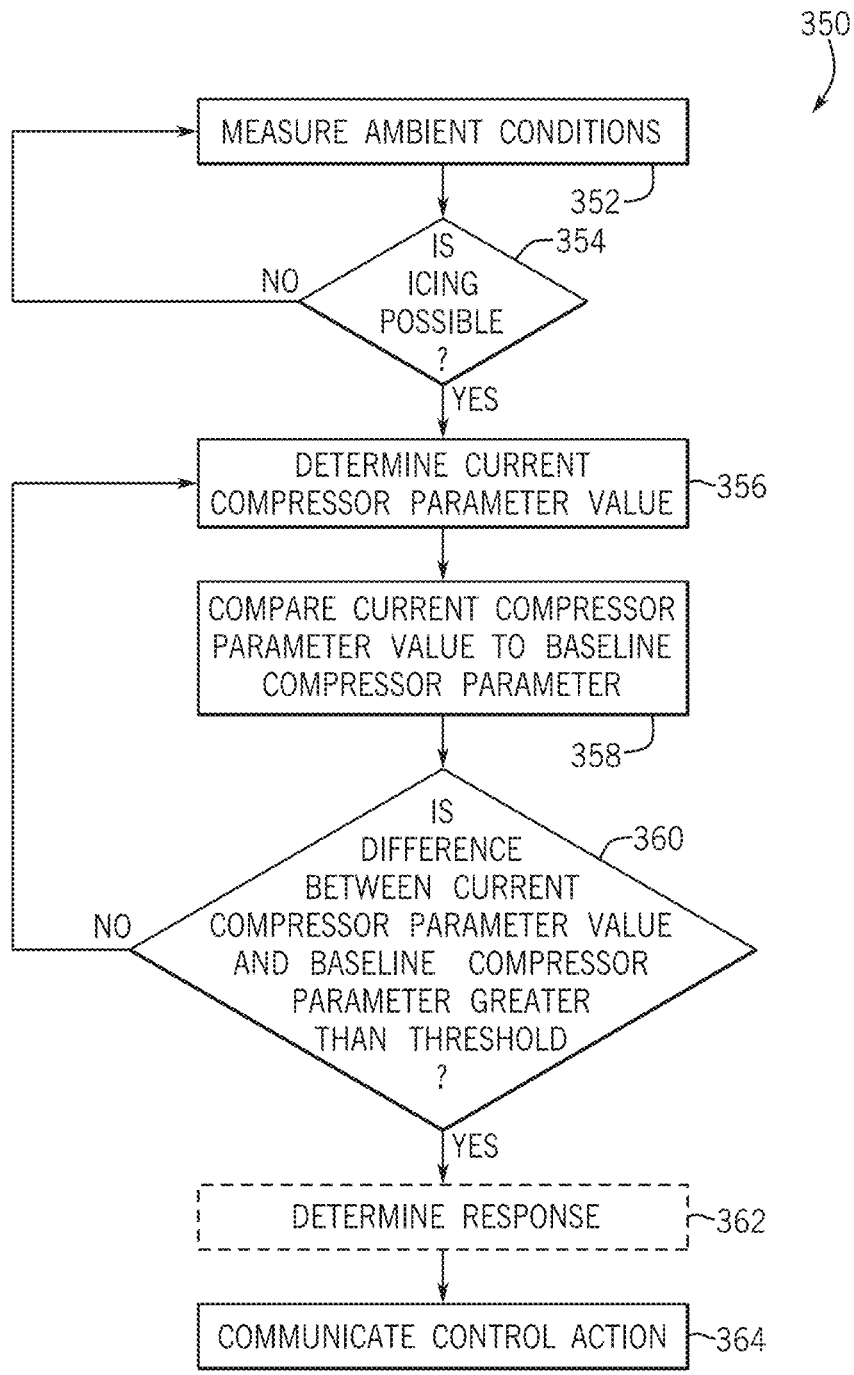
FIG. 5 is a flow chart of an embodiment of a method for determining the icing condition of the compressor of FIG. 2.

FIG. 5 is a flow chart of an embodiment of a method 350 for detecting an icing condition of the compressor 24. The method 350 may include several optional steps. The method 350 of FIG. 5 is described with reference to the elements of FIGS. 1-4. In some embodiments, the method 350 may be performed by the controller 56. However, the controller 56 may be located remote from the gas turbine system 10, or the method 350 may be performed by the network device 62. Additionally, one or more steps of the method 350 may be performed simultaneously or in a different sequence from the sequence in FIG. 5.

First, the method 350 may optionally include measuring (block 352) ambient conditions (e.g., environmental conditions) related to the gas turbine system 10. The ambient conditions may include measuring the environmental conditions of the air, such as the humidity, the pressures, and the temperatures related air 13 into the compressor 24. The method 350 may also include deciding (node 354) if icing of the compressor 24 is possible based at least in part on the measured ambient conditions. For example, in some embodiments, the ambient conditions are compared to respective icing thresholds. If the ambient conditions do not satisfy respective icing thresholds, then icing of the compressor 24 may not be possible. Accordingly, if icing of the compressor 24 is not possible, the method 350 may cycle back to block 352 and continue measuring ambient conditions until icing is determined to be possible.

If the method 350 determines via node 354 that icing of the compressor 24 is possible, the method 350 may include determining (block 356) a current compressor parameter value. The current compressor parameter value may be a value of compressor efficiency, compressor flow, or any combination thereof. The current compressor parameter value may be determined or predicted by the adaptive real time model via the real time sensor-signals 100. The current value of the compressor parameter may be stored in the controller 56. Additionally, the method 350 may include comparing (block 358) the current compressor parameter value to a baseline compressor parameter value. The baseline 310 of the compressor parameter may be determined based on data collected from the gas turbine system 10 when an icing condition of the compressor 24 was not detected (e.g., during normal operation). The compressor parameter baseline may have been determined based on input from many types of sensors, such as compressor inlet temperature, inlet dew point temperature, compressor discharge temperature, compressor discharge pressure, or any combination thereof. The method 350 may additionally define the predetermined threshold 311 relative to the baseline 310. As discussed above, the baseline 310 may change based on predicted degradations of the compressor parameters, among other considerations. Additionally, the baseline 310 of the compressor parameter may be a predetermined model generated on a test bench and provided to controllers 56 of gas turbines 10 having similar characteristics.

In some embodiments, the method 350 also includes deciding (node 360) if a difference between the current compressor parameter value and the baseline 310 for a particular compressor value is greater than the predetermined threshold 311. If the difference is not greater than the predetermined threshold 311, the method 350 may return to block 356 to continue determining the current compressor parameter values. As discussed above, in some embodiments, the rate of change of the compressor value may additionally or alternatively be compared to the predetermined threshold rate of change 343. Accordingly, the icing condition may be detected only when the values are outside of the predetermined threshold, when the rate of change of the values is greater than the predetermined threshold rate of change, or any combination thereof.

Further, if the difference is greater than the predetermined threshold 311, then the method 350 has determined that a method 350 may optionally include determining (block 362) a response. The response may include providing the icing indication to the inlet bleed heat system 40, providing the icing indication to an operator, determining a control action based on the control action, or any combination thereof. Further, the method 350 may include communicating (block 364) the control action. The communication may be to a user via a display, to the inlet bleed heat system 40 to activate a bleed flow, to the inlet guide vanes 88 to adjust their angle relative to the radial direction 32, or any combination thereof. In some embodiments, the method 350 may cycle back to block 356 until the icing condition is no longer detected.

Further, while the method 350 has been described above with reference to comparing compressor parameter values to baseline compressor parameter values, it is to be understood that detection of the icing condition may additionally or alternatively be performed by computing modifications to the baseline 310. For example, after determine (block 356) the current compressor value, a modification to the baseline 310 to align the baseline with the current compressor value may be computed. The modification may then be compared to a respective modification threshold. If the modification is greater than the respective modification threshold, the icing condition may be detected and control actions may be performed accordingly.

Technical effects of the subject matter include systems and methods for detecting an icing condition of the compressor of the gas turbine system and performing control actions to reduce or eliminate icing of the compressor. The embodiments discussed herein may utilize models of the compressor parameters (e.g., compressor efficiency, compressor flow) to detect icing conditions. The models of the compressor parameters may be based at least in part on sensed ambient environment conditions, compressor output parameters (e.g., compressor discharge temperature, compressor discharge pressure), gas turbine parameters, or any combination thereof. Comparison of one or more current compressor parameters to respective models of the compressor parameters, comparison of modifications to the respective models to align the respective models with the one or more current compressor parameters, or any combination thereof may indicate an icing condition more reliably than comparison of ambient environment conditions to thresholds alone. Upon detection of an icing condition of the compressor, a controller of the gas turbine system may execute a control action to heat the air flow to the compressor, adjust the air flow to the compressor, or to notify an operator of the gas turbine system regarding the icing condition, or any combination thereof. Accordingly, the embodiments described herein may enable the gas turbine system more appropriately administer control actions to reduce or eliminate icing conditions of the compressor, thereby increasing the efficiency of the gas turbine system.

This written description uses examples to disclose the subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
a controller coupled to an inlet bleed heat system of a compressor, wherein the controller is configured to:
  detect an icing condition of an inlet portion of the compressor, wherein detecting the icing condition comprises:
    determining a current compressor efficiency value of the compressor based at least in part on sensed compressor values of the compressor;
    comparing the current compressor efficiency value to a compressor efficiency model of the compressor; and
    providing an icing indication to the inlet bleed heat system in response to a difference between the current compressor efficiency value and the compressor efficiency model being greater than a threshold.

2. The system of claim 1, wherein the controller is configured to determine a quantity of a bleed flow from the inlet bleed heat system to the inlet portion of the compressor to cause the difference to be less than the threshold.

3. The system of claim 1, wherein the controller is configured to control a bleed flow along a bleed path from the inlet bleed heat system to the inlet portion of the compressor automatically upon providing the icing indication to the inlet bleed heat system.

4. The system of claim 1, comprising a compressor sensor coupled to the compressor and to the controller, wherein the compressor sensor is configured to provide the sensed compressor values to the controller, and the compressor sensor comprises a temperature sensor, a pressure sensor, or any combination thereof.

5. The system of claim 1, comprising one or more ambient environment sensors coupled to the controller, wherein the controller is configured to:
receive ambient environment data from the one or more ambient environment sensors, wherein the ambient environment data comprises ambient temperature of a flow to the inlet portion, humidity of the flow to the inlet portion, or any combination thereof;
compare the ambient environment data to one or more icing thresholds; and
detect the icing condition of the inlet portion only if the ambient environment data satisfies the one or more icing thresholds.

6. The system of claim 1, wherein the difference is a first difference, wherein the threshold is a first threshold, and wherein detecting the icing condition comprises:
determining a current compressor flow value of the compressor based at least in part on the sensed compressor values of the compressor;
comparing the current compressor flow value to a compressor flow model of the compressor; and
providing the icing indication to the inlet bleed heat system in response to the first difference being greater than the first threshold and a second difference between the current compressor flow value and the compressor flow model being greater than a second threshold.

7. The system of claim 1, wherein detecting the icing condition comprises:
determining a first rate of change over time of compressor efficiency, a second rate of change over time of compressor flow, or any combination thereof;
comparing the first rate of change over time of compressor efficiency to a first rate of change threshold, the second rate of change over time of compressor flow to a second rate of change threshold, or any combination thereof; and
providing the icing indication to the inlet bleed heat system in response to the first rate of change over time of compressor efficiency being greater than the first rate of change threshold, the second rate of change over time of compressor flow being greater than the second rate of change threshold, or any combination thereof.

8. The system of claim 1, wherein the compressor efficiency model is based at least in part on a predicted efficiency degradation.

9. The system of claim 1, wherein detecting the icing condition comprises:

comparing the compressor efficiency model of the compressor to the current compressor efficiency value;

based on the comparison, determining a modification to the compressor efficiency model to align the compressor efficiency model with the current compressor efficiency value; and implementing the modification to align the compressor efficiency model with the current compressor efficiency value.

10. The system of claim 1, wherein the compressor efficiency model is based at least in part on a load on the compressor, a speed of the compressor, or any combination thereof.

11. A system comprising:
a controller coupled to an inlet bleed heat system of a compressor, wherein the controller is configured to:
detect an icing condition of an inlet portion of the compressor, wherein detecting the icing condition comprises:
determining a current compressor efficiency value of the compressor, a current compressor flow value of the compressor, or any combination thereof, wherein the current compressor efficiency value and the current compressor flow value are based at least in part on sensed compressor values of the compressor;
comparing a compressor efficiency model of the compressor to the current compressor efficiency value, comparing a compressor flow model of the compressor to the current compressor flow value, or any combination thereof;
based on the comparison, determining a first modification to the compressor efficiency model to align the compressor efficiency model with the current compressor efficiency value, a second modification to the compressor flow model to align the compressor flow model with the current compressor flow value, or any combination thereof; and
providing an icing indication to the inlet bleed heat system if the first modification to the compressor efficiency model is greater than a first threshold, the second modification to the compressor flow model is greater than a second threshold, or any combination thereof.

12. The system of claim 11, wherein the controller is configured to determine a quantity of a bleed flow to cause the first modification to be less than the first threshold or to cause the second modification to be less than the second threshold.

13. The system of claim 11, comprising a compressor sensor coupled to the compressor and to the controller, wherein the compressor sensor is configured to provide the sensed compressor values to the processor, and the compressor sensor comprises a temperature sensor, a pressure sensor, or any combination thereof.

14. The system of claim 11, comprising one or more ambient environment sensors coupled to the controller, wherein the controller is configured to:
receive ambient environment data from the one or more ambient environment sensors, wherein the ambient environment data comprises ambient temperature of a flow to the inlet portion, humidity of the flow to the inlet portion, or any combination thereof;
compare the ambient environment data to one or more icing thresholds; and
detect the icing condition of the inlet portion only if the ambient environment data satisfies the one or more icing thresholds.

15. The system of claim 11, wherein the compressor efficiency model is based at least in part on a predicted efficiency degradation and the compressor flow model is based at least in part on a predicted flow degradation.

16. The system of claim 11, wherein detecting the icing condition comprises:
determining the current compressor efficiency value of the compressor and the current compressor flow value of the compressor;
comparing the compressor efficiency model of the compressor to the current compressor efficiency value and comparing the compressor flow model of the compressor to the current compressor flow value;
based on the comparison, determining the first modification to the compressor efficiency model to align the compressor efficiency model with the current compressor efficiency value and the second modification to the compressor flow model to align the compressor flow model with the current compressor flow value; and
providing the icing indication to the inlet bleed heat system if the first modification to the compressor efficiency model is greater than the first threshold and the second modification to the compressor flow model is greater than the second threshold, or any combination thereof.

17. A method comprising:
receiving ambient environment data comprising an ambient temperature of a flow to an inlet portion of a compressor, a humidity of the flow to the inlet portion, or any combination thereof;
receiving sensed compressor values of the compressor comprising a temperature of an output of the compressor, a pressure of the output of the compressor, or any combination thereof;
comparing the ambient environment data to one or more icing thresholds;
detecting an icing condition of the inlet portion only if the ambient environment data satisfies the one or more icing thresholds, wherein detecting the icing condition comprises:
determining a current compressor efficiency value of the compressor, a current compressor flow value of the compressor, or any combination thereof, wherein the current compressor efficiency value and the current compressor flow value are based at least in part on the sensed compressor values of the compressor;
comparing the current compressor efficiency value to a compressor efficiency model of the compressor, the current compressor flow value to a compressor flow model of the compressor, or any combination thereof; and
providing an icing indication to an inlet bleed heat system if a first difference between the current compressor efficiency value and the compressor efficiency model is greater than a first threshold, a second difference between the current compressor flow value and the compressor flow model is greater than a second threshold, or any combination thereof.

18. The method of claim 17, wherein detecting the icing condition comprises:
determining a first rate of change over time of compressor efficiency, a second rate of change over time of compressor flow, or any combination thereof;

comparing the first rate of change over time of compressor efficiency to a first rate of change threshold, the second rate of change over time of compressor flow to a second rate of change threshold, or any combination thereof; and providing the icing indication to the inlet bleed heat system if the first rate of change over time of compressor efficiency is greater than the first rate of change threshold, the second rate of change over time of compressor flow is greater than the second rate of change threshold, or any combination thereof.

19. The method of claim 17, wherein the compressor efficiency model is based at least in part on a predicted efficiency degradation and the compressor flow model is based at least in part on a predicted flow degradation.

20. The method of claim 17, comprising controlling the inlet bleed heat system to direct a bleed flow from the compressor to the inlet portion of the compressor based at least in part on the icing indication.

\* \* \* \* \*